(12) United States Patent
Höfer (10) Patent No.: US 7,112,782 B2
(45) Date of Patent: Sep. 26, 2006

(54) OPTICAL POSITION MEASURING SYSTEM

(75) Inventor: Volker Höfer, Traunreut (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 155 days.

(21) Appl. No.: 10/964,179

(22) Filed: Oct. 13, 2004

(65) Prior Publication Data
US 2005/0077457 A1   Apr. 14, 2005

(30) Foreign Application Priority Data
Oct. 14, 2003   (DE) ................. 103 47 604

(51) Int. Cl.
*G01D 5/34* (2006.01)

(52) U.S. Cl. ............. 250/231.13; 250/237 G; 250/231.16; 356/616; 356/617

(58) Field of Classification Search ..............
250/231.13–231.18, 237 G, 237 R; 356/616–618; 33/1 PT, 1 N, 1 L; 341/11, 13
See application file for complete search history.

(56) References Cited

U.S. PATENT DOCUMENTS

| | | | |
|---|---|---|---|
| 4,782,229 A | 11/1988 | Ernst | |
| 5,068,530 A | 11/1991 | Ieki et al. | |
| 5,332,896 A | 7/1994 | Holzapfel | |
| 5,814,812 A * | 9/1998 | Holzapfel | 250/231.16 |
| 5,874,729 A * | 2/1999 | Holzapfel | 250/231.16 |
| 5,889,280 A * | 3/1999 | Matsuura | 250/237 G |
| 5,994,692 A * | 11/1999 | Holzapfel | 250/237 G |
| 6,198,534 B1 * | 3/2001 | Hofer et al. | 356/399 |
| 6,392,224 B1 * | 5/2002 | Holzapfel et al. | 250/231.13 |
| 6,452,159 B1 * | 9/2002 | Holzapfel et al. | 250/231.13 |

FOREIGN PATENT DOCUMENTS

| | | |
|---|---|---|
| DE | 2 207 132 | 8/1973 |
| DE | 36 16 144 A1 | 11/1987 |
| DE | 42 02 680 A1 | 5/1993 |
| DE | 42 09 673 A1 | 5/1993 |
| DE | 195 08 700 C1 | 8/1996 |

* cited by examiner

*Primary Examiner*—Thanh X. Luu
*Assistant Examiner*—Davienne Monbleau
(74) *Attorney, Agent, or Firm*—Brinks Hofer Gilson & Lione (57) ABSTRACT

An optical position measuring system including a scale and a scanning unit. The scanning unit includes a light source that emits light beams and a periodic scanning graduation having scanning graduation marks arranged periodically at a scanning graduation period along a measuring direction. The scanning unit further including a detector arrangement. The scanning graduation or the scale graduation includes at least three partial tracks, which adjoin perpendicularly with respect to the measuring direction, and graduation marks associated with each of the at least three partial tracks have a defined and constant offset spacing from their nominal positions, wherein the offset spacings associated with adjoining ones of the at least three partial tracks differ, so that filtering of undesired harmonic waves out of the at least one periodic scanning signal results from said offset spacings.

31 Claims, 5 Drawing Sheets

OPTICAL POSITION MEASURING SYSTEM

Applicant claims, under 35 U.S.C. §119, the benefit of priority of the filing date of Oct. 14, 2003 of a German patent application, copy attached, Serial Number 103 47 604.0, filed on the aforementioned date, the entire contents of which is incorporated herein by reference.

BACKGROUND OF THE INVENTION

1. Field of the Invention

The present invention relates to an optical position measuring system, which provides scanning signals free of harmonic waves and includes a scale with a scale graduation, a scanning unit with a light source, at least one periodic scanning graduation and a detector arrangement.

2. Discussion of Related Art

In connection with known incremental position measuring arrangements on an optical basis, a scale with a periodic scale graduation is customarily scanned by a periodic scanning graduation. The latter is arranged, together with further components, for example, a light source and a detector arrangement, in a scanning unit, which is movable in relation to the scale in at least one measuring direction. In the ideal case an exactly sinusoidal scanning signal exists, which can be further processed, respectively further subdivided, in suitable electronic follow-up devices by known interpolation methods. However, the actually resultant shape of the detected scanning signals customarily differs more or less greatly from the ideal sinusoidal shape. Various causes can be responsible for this, for example deviations from ideal conditions of the graduation periods on the scale side and/or scanning side, fuzzy edges of the graduation mark, etc. Therefore, in actual use the resultant scanning signals contain harmonic waves, which in particular can hamper further signal processing in the form of interpolation. It is therefore basically attempted to minimize the harmonic wave content of the scanning signals as much as possible.

A multitude of attempts for filtering harmonic waves are already known from the prior art. For example, in the present case reference is made to steps for filtering harmonic waves known from DE 195 08 700 C1 or U.S. Pat. No. 5,068,530. For eliminating the particularly interfering third and fifth harmonic wave, it is proposed in these publications to arrange the graduation marks on the scanning plate at defined offset spacings from the respective nominal positions of the graduation marks. The required offset spacings always result from the respectively to be eliminated harmonic wave.

If, based on this filtering principle, it is now intended to eliminate, for example two dominant harmonic waves, for example the third and fifth harmonic waves, it is proposed in accordance with FIG. 4 of DE 195 08 700 C1 to provide the required offset spacings on the scanning plate between the individual graduation marks, as well as between groups of graduation marks. As a result, two defined offset spacings of the graduation marks from the original nominal positions therefore exist on the scanning plate in the measuring direction.

However, this filtering principle can no longer be employed in connection with certain incremental scanning operations, in particular in case Vernier scanning is intended. This is understood to be a scanning principle wherein the scale graduation and the scanning graduation have slightly different graduation periods, so that in accordance with the interaction of the light beams emitted by the light source a spatially periodic Vernier fringe pattern of a defined fringe pattern period P results in a detection plane by the two graduations. In this case the fringe pattern period P is as a rule clearly greater than the graduation periods $TP_M$, $TP_A$ of the scale and the scanning graduations. If now a filtering principle in accordance with FIG. 4 of the mentioned DE 195 08 700 C1 were employed for eliminating the third and fifth harmonic waves, this would result in an interference with the fixed phase relationships between the scale and the scanning grating which are required for scanning. The creation of a Vernier fringe pattern of a correct phase would no longer be possible.

This problem could be sidestepped in principle with the use of a filter variation as disclosed, for example, in FIG. 4 of the mentioned U.S. Pat. No. 5,068,530, the entire contents of which is incorporated herein by reference. It is provided there to divide the scanning graduation on the scanning plate into several partial tracks perpendicularly with respect to the measuring direction, i.e. in the longitudinal direction of the graduation marks. Accordingly, with this variation the required offset spacings for filtering would be provided in the longitudinal direction of the graduation marks and not, as mentioned above, in the measuring direction. Vernier scanning would be possible in principle with such filtering. However, the sensitivity of the scanning, or of the harmonic wave filtering, in regard to twisting of the scale and the scanning unit around an axis perpendicularly in relation to the scale possibly resulting during measuring operations or in the course of assembly, is problematic here. In what follows, such twisting will also be called Moiré twisting.

OBJECT AND SUMMARY OF THE INVENTION

In connection with an optical position measuring system based on the Vernier principle, it is an object of the present invention to disclose an opportunity for filtering harmonic waves. Besides a far-reaching removal of the interfering harmonic waves from the scanning signal, the greatest possible insensitivity of the signal generation, including the harmonic wave filtering, to twisting of the scale and the scanning unit around an axis perpendicularly in relation to the scale is desirable.

This object is attained by an optical position measuring system including a scale having a scale graduation with scale graduation marks, which are periodically arranged at a scale graduation period, $TP_M$, in a measuring direction and a scanning unit, which is movable with respect to the scale in at least the measuring direction. The scanning unit includes a light source that emits light beams and a periodic scanning graduation having scanning graduation marks arranged periodically at a scanning graduation period along the measuring direction, wherein the scale graduation period, $TP_M$, and the scanning graduation period differ from each other. The scanning unit further including a detector arrangement, by which in case of a relative movement between the scale and the scanning unit at least one periodic scanning signal is detected, which results from scanning a periodic Vernier fringe pattern having a fringe pattern period in a detector plane of the detector arrangement. The scanning graduation or the scale graduation includes at least three partial tracks, which adjoin perpendicularly with respect to the measuring direction, and graduation marks associated with each of the at least three partial tracks have a defined and constant offset spacing from their nominal positions, wherein the offset spacings associated with adjoining ones of the at least three partial tracks differ, so that filtering of undesired harmonic waves out of the at least one periodic scanning signal results from said offset spacings.

In accordance with the present invention, the graduation which is used for harmonic wave filtering is divided into more than two partial tracks perpendicularly in relation to the measuring direction, and the offset spacings required for harmonic wave filtering are provided in the different partial tracks. Thus, a defined offset spacing of the respective graduation marks from their actual nominal positions is provided in each partial track, wherein the offset spacings of adjoining graduation tracks differ from each other, so that the desired filtering of the undesired harmonic wave portion out of the scanning signal results from the selected offset spacings. In this case, the scale graduation, as well as the scanning graduation, can be embodied in accordance with the present invention and take on the respective filtering functions.

The filtering variation in accordance with the present invention for removing undesired harmonic wave portions in a Vernier scanning process has shown itself to be particularly advantageous in connection with possible twisting of the scanning unit in relation to the scale around an axis perpendicular to the scale. Because of the steps in accordance with the present invention, the desired filter effect also is maintained in case of such a misalignment in the course of assembly, or during measuring operations.

Preferably, partial offset spacing for removing the third and fifth harmonic wave are defined, and are combined into suitable resultant offset spacings for the respective partial track.

Further advantages, as well as details of the present invention ensue from the following description of exemplary embodiments of the position measuring systems in accordance with the present invention by the attached drawing figures.

DETAILED DESCRIPTION OF THE PREFERRED EMBODIMENTS

The basic scanning beam path of a first variation of the optical position measuring system in accordance with the present invention will be explained by a schematic representation in FIG. 1. In this example, it is embodied as a linear position measuring system operating by transmitted light. Substantially, the position measuring system contains a first scale 10, as well as a scanning unit 20, which can be moved in the measuring direction x with respect to the scale 10. In the present case, the measuring direction x is oriented perpendicularly with respect to the drawing plane.

The scale 10 and the scanning unit 20 can possibly be arranged on a numerically-controlled machine tool, and are movable in relation to each other in the measuring direction x for detecting the relative positions of two objects which are movable with respect to each other, for example a tool and a workpiece. The position information which can be generated from the resultant scanning signals can then in turn be evaluated in a known manner by a numerical machine tool control for control and regulating purposes.

In the represented example, the scale 10 includes a transparent graduation support made of glass, for example, on which a scale graduation 10.1 is arranged, extending in the measuring direction x. The scale graduation 10.1 includes a periodic arrangement of scale graduation marks extending in its direction of extension. The scale graduation marks are formed in the shape of opaque narrow lines on the graduation support, between which transparent partial areas are arranged. The periodicity of the scale graduation marks will be called scale graduation period $TP_M$ in what follows. In a possible embodiment of the position measuring system in accordance with the invention, $TP_M$ is selected to equal 20 µm.

A light source 21, upstream of which an optical collimator device is arranged for collimating the emitted beams of rays before they are further propagated in the direction toward the scale 10, or the scale graduation 10.1, is provided on the side of the scanning unit 20. After the scale graduation 10.1 has been exposed by the light beams emitted by the light source 21, these beams subsequently reach a scanning graduation 23.1, arranged on a scanning plate 23, on the side of the scanning unit 10. The scanning plate 23 includes a transparent graduation support, on which the scanning graduation 23.1 is arranged and extends in the measuring direction x. The scanning graduation 23.1 includes a periodic arrangement of scanning graduation marks, wherein in the present example the scanning graduation marks are again embodied as opaque narrow lines on the graduation support, between which transparent partial areas are located. The arrangement of the graduation marks on the side of the scanning graduation 23.1 has been provided at a value $TP_A$, called scanning graduation period in what follows.

As already mentioned at the outset, the present position measuring system utilizes the so-called Vernier principle, which requires different scale and scanning graduation periods $TP_M$, $TP_A$. Therefore, in an exemplary embodiment of the position measuring system of the invention, in case where a scale graduation period $TP_M=20$ µm, the scanning graduation period $TP_A$ is selected to equal 20.3846 µm.

With scale and scanning graduations $TP_M$, $TP_A$ selected in this way, following the interaction of the ray beams with the scale and scanning graduation 10.1, 23.1, a spatially periodic Vernier fringe pattern of a fringe pattern period P=1.06 mm appears in a detection plane. A detector arrangement 24 has been placed in the detection plane on the side of the scanning unit 10 which, in case of the relative movement between the scale 10 and the scanning unit 20, is used for generating at least one periodic scanning signal from the scan of the Vernier fringe pattern, which is then periodically modulated.

Preferably the detector arrangement 24 includes a multitude of individual rectangular-shaped detector elements, which are arranged with the long sides of the rectangles adjoining each other in the measuring direction x. Such detector arrangements are sometimes also called structured photo-detectors. Those detector elements, which provide in-phase scanning signals in the course of scanning the Vernier fringe pattern, are respectively connected with each other in an electrically conducting manner. Customarily a spatial arrangement of the detector elements is provided in such a way that three or four detector elements are always arranged within a fringe pattern period P. It is possible in this way in particular to assure so-called one field scanning, which is impervious to soiling or contamination. The selection of the number of detector elements per fringe pattern period P is a function of the number of differently phased scanning signals to be evaluated. For example, four scanning signals, each phase-shifted by 90°, require the arrangement of four detector elements within a fringe pattern period P, while three scanning signals, phase-shifted by respectively 120°, require the arrangement of three detector elements with a fringe pattern period P.

Figure 2:
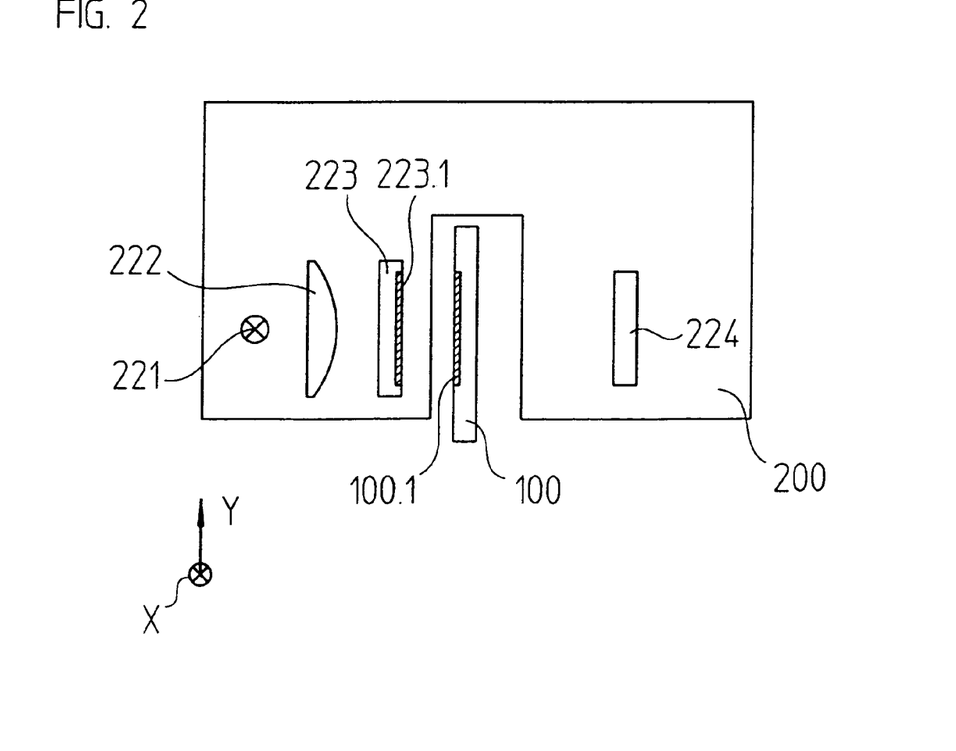
FIG. 2 shows a possible path of the scanning beams of a second variation of the optical position measuring system in accordance with the present invention.

Prior to addressing the steps for harmonic wave filtering in such a position measuring system in detail in what follows, an alternate beam path will be briefly explained, which can also be realized in a position measuring system in accordance with the present invention and which is schematically represented in FIG. 2. The example in FIG. 2 basically differs from the above explained variation in the arrangement of the scanning plate 223, or the scanning graduation 223.1 in the scanning beam path. Thus, it has now been provided to arrange the scanning graduation 223.1 downstream of the optical collimator device 222, so that the beams of rays emitted by the light source 221 first impinge on the scanning graduation 223.1 before reaching the scale graduation 100.1, and wherein finally the periodic Vernier fringe pattern results in the detector plane from the interaction of the light beams with the scanning and scale graduation 223.1, 100.1. A detector arrangement 224 has again been placed in the detector plane and is basically constructed in the same way as in the above explained case.

Figure 1:
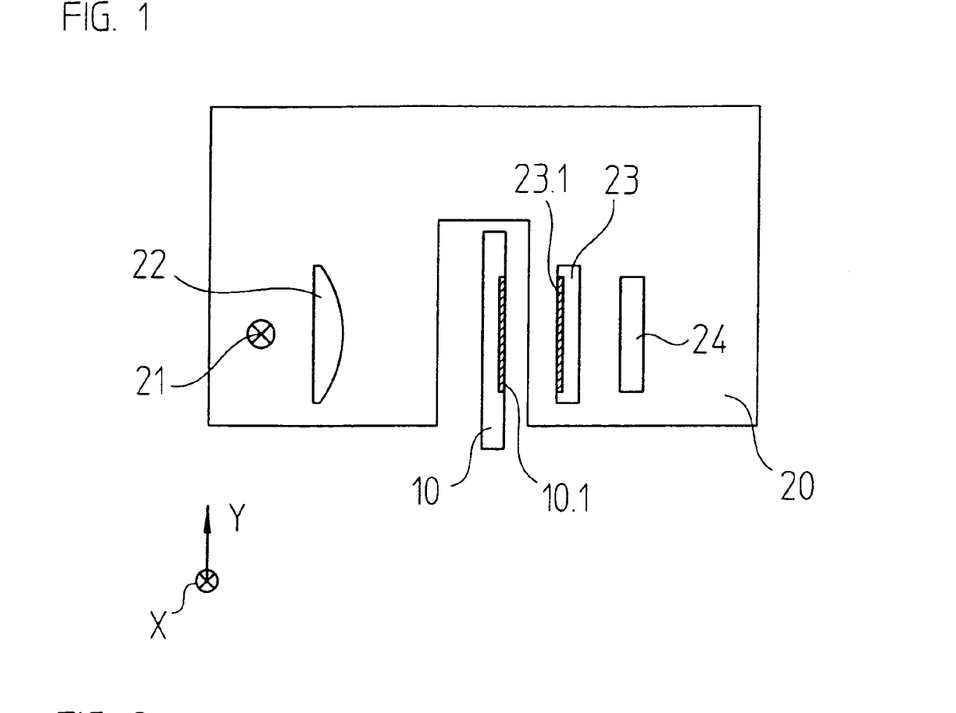
FIG. 1 shows a possible path of the scanning beams of a first variation of an optical position measuring system in accordance with the present invention.

Otherwise the structure of this exemplary embodiment of the position measuring system in accordance with the present invention, having a scale 100 and a scanning unit 200, is identical with the example of FIG. 1, explained in detail above.

It should furthermore be mentioned here that, within the scope of the present invention, the steps explained in what follows can be used not only in connection with transmitted light systems, but of course also with position measuring systems operated by incident light. Moreover, the same applies to rotary measuring arrangements, which can possibly also be realized in accordance with the present invention.

For providing the desired harmonic wave filtering in connection with such scanning beam paths, definite steps are required either on the side of the scale graduation or the side of the scanning graduation, which will be explained in what follows. Here, the detailed explanation of the basic principles will be provided in what follows by the example of a harmonic wave filtering process by the scanning graduation. It is of course possible to transfer these steps analogously to the scale graduation.

In the first variation of the present invention it is now provided for harmonic wave filtering to divide the graduation marks, i.e. either the scale or the scanning graduation marks, used for filtering into more than two graduation mark sections along their longitudinal direction, so that at the end several partial tracks result perpendicularly in relation to the measuring direction x, which are constituted by the individual graduation mark sections. The graduation marks, or graduation mark sections, in the respective partial tracks of the scale or scanning graduation used for filtering have a defined offset spacing $\Delta V_n$ from their nominal positions, which are predetermined by the required scale or scanning graduation period $TP_M$, $TP_A$. The filtering, or elimination, of the undesired harmonic wave portion from the scanning signal is accomplished via the offset spacings $\Delta V_n$, which differ in adjoining partial tracks. Therefore, instead of providing the entire graduation marks with offset spacings $\Delta V_n$, as in the filtering variations in accordance with the prior art discussed at the outset, the division in accordance with the present invention of the graduation marks into more than two graduation mark sections takes place along their longitudinal direction.

Figure 3:
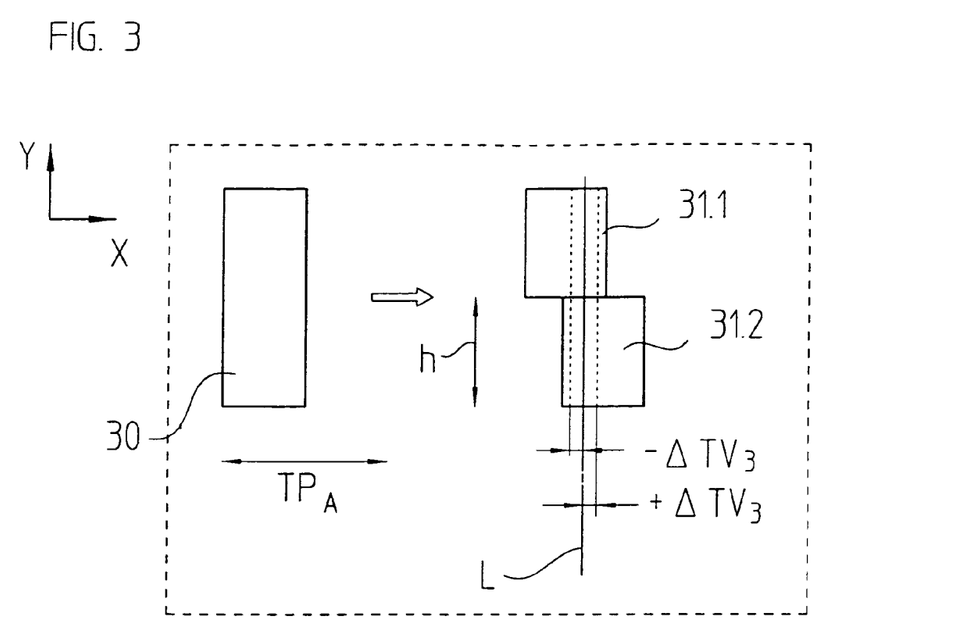
FIG. 3 is a first schematic representation for explaining steps taken in accordance with the present invention.

This principle will be represented by FIG. 3 wherein, for reasons of greater clarity, only the division of a single graduation mark 30 in a scanning graduation along its longitudinal direction y into two graduation mark sections 31.1, 31.2 of the same length, or height h, is provided. A multitude of such graduation marks are arranged, adjoining each other in the measuring direction x, on the scanning plate within the grid of the scanning graduation period $TP_A$, this means that the graduation mark 30 therefore has the width $TP_A/2$. The line L indicates the nominal position of the center of the non-offset graduation mark 30, which is predetermined by the scanning graduation period $TP_A$. In the example represented, the upper graduation mark section 31.1, or its center, is arranged offset from this nominal position L to the left by the partial offset spacing $-\Delta TV_3$, but the lower graduation mark section 31.2 is arranged offset to the right by the partial offset spacing $+\Delta TV_3$. Such a selection of the partial offset spacings $+/-\Delta TV_3$ in the two divided graduation mark sections 31.1, 31.2 is used for filtering the third harmonic wave out of the scanning signal. Analogously, the further graduation marks in the scanning graduation would have to be divided into respectively two such graduation mark sections along their longitudinal direction y, so that in the end a partial track with the appropriate partial offset spacings $+/-\Delta TV_3$ results per graduation mark section.

For a defined harmonic wave k which is to be eliminated from the scanning signal, the corresponding partial offset spacings $+/-\Delta TV_k$ should be mentioned, which are to be provided in the respective partial tracks. In general, this results from the equation $$\Delta TV_k = (\tfrac{1}{2} * 1/k * TP_M/2) \qquad \text{(Eq. 1)}$$

wherein k=2, 3, 5, 7, . . . .

The periodicity of the scale graduation, or the scale graduation period $TP_M$, is also correctly inserted into Equation 1, from which the periodicity of the scanning signal is derived in the end. However, in the above explained Vernier system the scanning graduation period $TP_A$ differs only slightly from the former.

In actual use it has been shown to be sufficient in many cases to limit filtering of the undesired harmonic wave to the particularly interfering third and fifth harmonic wave (k=3, 5), filtering of the 2nd harmonic wave (k=2) is preferably restricted to the case wherein three scanning signals, phase-shifted by 120°, are generated.

To determine the offset spacings $\Delta V_n$ required for filtering the third and fifth harmonic wave in the individual partial tracks, it is first necessary to determine the respective partial offset spacings for k=3 and k=5 by means of the Equation 1.

Therefore these result in accordance with $$\Delta TV_3 = (\tfrac{1}{2} \cdot 1/3 \cdot TP_M/2) \qquad \text{(Eq. 2.1)}$$

$$\Delta TV_5 = (\tfrac{1}{2} \cdot 1/5 \cdot TP_M/2) \qquad \text{(Eq. 2.2)}$$

Figure 4:
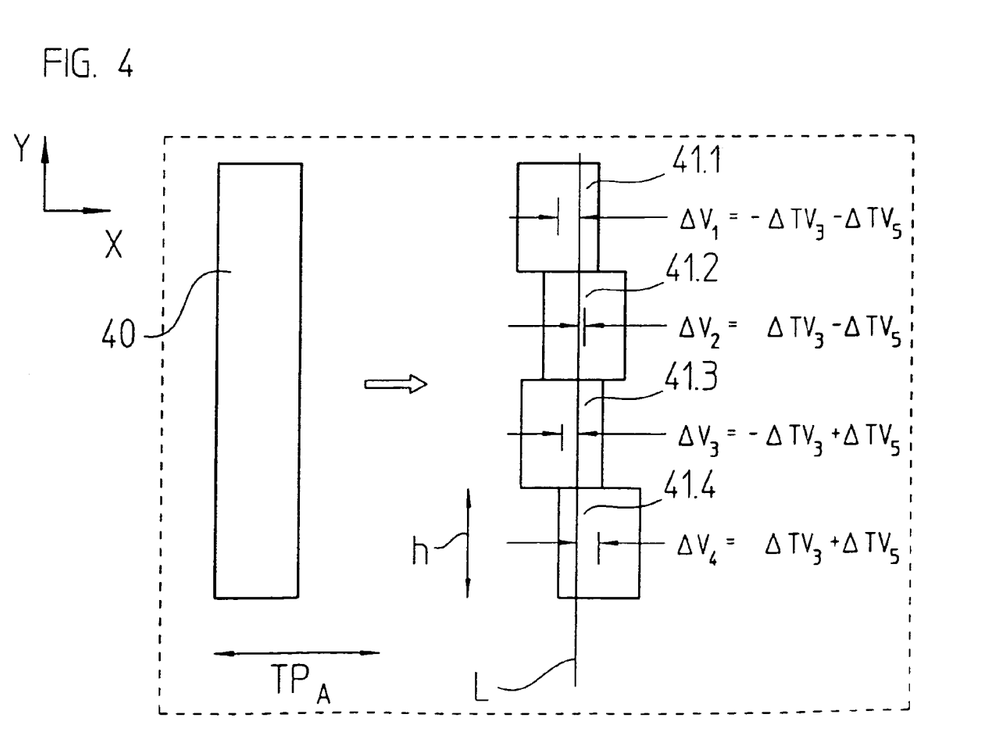
FIG. 4 is a partial plan view of a first embodiment of a scanning graduation to be used with the position measuring systems of FIGS. 1 and 2 in accordance with the present invention.

It is now provided to arrange the respective graduation marks, or the graduation mark sections 41.1 to 41.4, in the four partial tracks offset from their nominal positions by the resultant offset spacings $\Delta V_1$ to $\Delta V_4$ shown in FIG. 4, wherein the nominal positions again result from the preset scanning graduation period $TP_A$. The resulting offset spacings $\Delta V_1$ to $\Delta V_4$ are derived, as shown in FIG. 4, from linear combinations of the partial offset spacings $\Delta V_3$ and $\Delta TV_5$. Again, different resultant partial spacings $\Delta V_1$ to $\Delta V_4$ of the graduation marks, or of the graduation mark sections 41.1 to 41.4, are provided in adjoining partial tracks.

The height h of individual graduation mark sections, or individual partial tracks, is preferably selected in such a way that a filtering effect with periods as short as possible can be achieved. This means that the filtering effect is preserved to a great extent, even in case of a possible Moiré twisting of the scanning plate with respect to the scale.

A further variation in accordance with the present invention for filtering harmonic waves, which is based on the criteria in connection with the previous exemplary embodiment, will be explained by FIG. 5. There, the division of a single graduation mark 50 into several partial tracks is represented, analogously to the last two drawing figures, wherein again the third and fifth harmonic wave is to be eliminated from the scanning signal in the end. Differing from the previous example, now a division along the longitudinal direction of the graduation mark 50 into a total of nine graduation mark sections 51.1 to 51.9, or partial tracks, is provided, each of which has the height h. Therefore nine partial tracks of the height h are arranged adjoining in the y direction, i.e. perpendicular to the measuring direction x, which in turn have defined offset spacings $\Delta V_n$ with respect to their actual nominal positions, wherein in this example n=1 ... 9.

As in the previous example, first the partial offset spacings for filtering the third and fifth harmonic wave (k=3, 5) were determined. These are identical to the values $\Delta TV_3$ and $\Delta TV_5$ shown in the two equations (2.1) and (2.2) above. It is provided to arrange the respective graduation marks, or the graduation mark sections 51.1 to 51.9, in the nine partial tracks offset by the resulting offset spacings $\Delta V_1$ to $\Delta V_9$ shown in FIG. 5 from their nominal positions, or the line L, wherein the nominal positions again result from the predetermined scanning graduation period $TP_A$. As represented in FIG. 5, the resultant offset spacings $\Delta V_1$ to $\Delta V_9$ are again derived from linear combinations of the partial offset spacings $\Delta TV_3$ and $\Delta TV_5$. Different resulting offset spacings $\Delta V_1$ to $\Delta V_9$ of the graduation marks, or the graduation mark sections 51.1 to 51.9, are provided in adjoining partial tracks.

Since there are only four different resulting offset spacings $\Delta V_1$ to $\Delta V_4$ for the two harmonic waves (k=3, 5) to be filtered out, the three offset spacings $\Delta V_2$, $\Delta V_3$ and $\Delta V_4$ are provided twice over the total length, but the offset spacing $\Delta V_1$ three times. In this case the same offset spacing $\Delta V_1$ for the graduation mark sections 51.1 and 51.9 is provided at each of the two ends in the respective partial tracks. Therefore the partial tracks with different offset spacings are multiply arranged perpendicularly with respect to the measuring direction x.

A once again improved filtering effect, along with a simultaneously increased insensitivity to Moiré twisting, can be achieved by a division into even more partial tracks than in the previous example. Insensitivity in case of displacements of the scale or scanning unit in the direction of the lines is simultaneously achieved by means of the arrangement of identically offset graduation mark sections 51.1 and 51.9 at the two ends.

Therefore, the embodiment of a graduation mark represented in FIG. 4 constitutes the basic filter unit required for the elimination of the third and fifth harmonic wave. The variation in FIG. 5 represents a further development of the basic filter unit which, in the end, corresponds to a multiple arrangement of the basic unit in the y direction.

Figure 5:
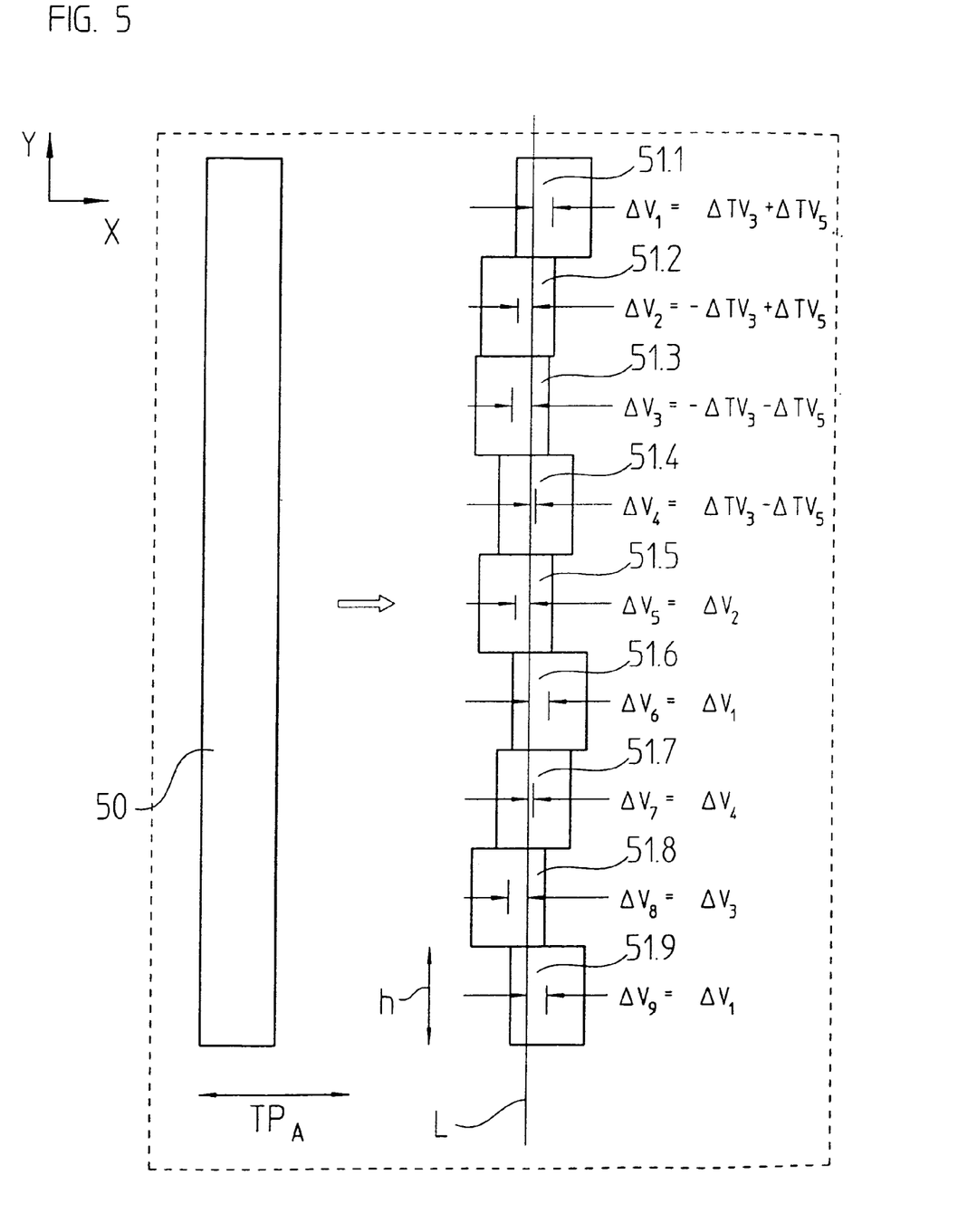
FIG. 5 is a partial plan view of a further embodiment of a scanning graduation to be used with the position measuring systems of FIGS. 1 and 2 in accordance with the present invention.
Figure 6:
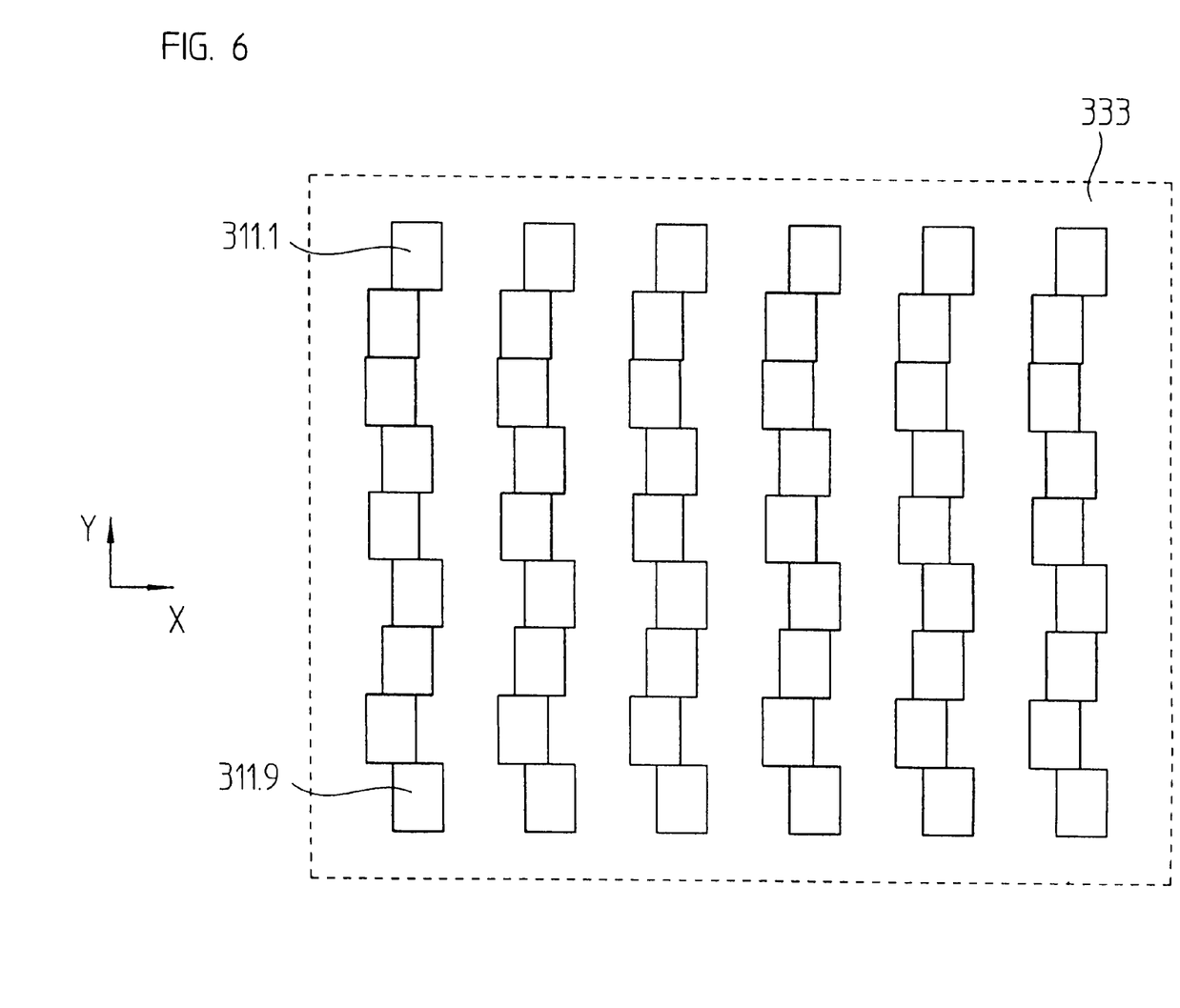
FIG. 6 is a total plan view of an embodiment of a scanning plate used with the scanning graduation of FIG. 5.

A plan view of a complete scanning plate with a scanning graduation based on the criteria explained by means of FIG. 5 is shown in a view from above in FIG. 6. Here, the total of nine resulting partial tracks 311.1 to 311.9, which have the previously discussed offset spacings for filtering the third and fifth harmonic wave, can be clearly seen.

Finally, a further variation of a position measuring system in accordance with the present invention will be explained by FIG. 7, wherein the drawing figure represents a partial view of a scanning graduation used for harmonic wave filtering, together with the detector elements used for scanning.

Each of the scanning graduation marks 71, 72, 73 in this exemplary embodiment includes three partial tracks, which in turn are arranged adjoining each other in the y direction. The offset spacings in the individual partial tracks between the adjoining graduation marks 71.1 to 71.3, 72.1 to 72.3, 73.1 to 73.3 are only shown schematically. Again, criteria as were explained in the previous examples can be used for the selection of these offset spacings.

Figure 7:
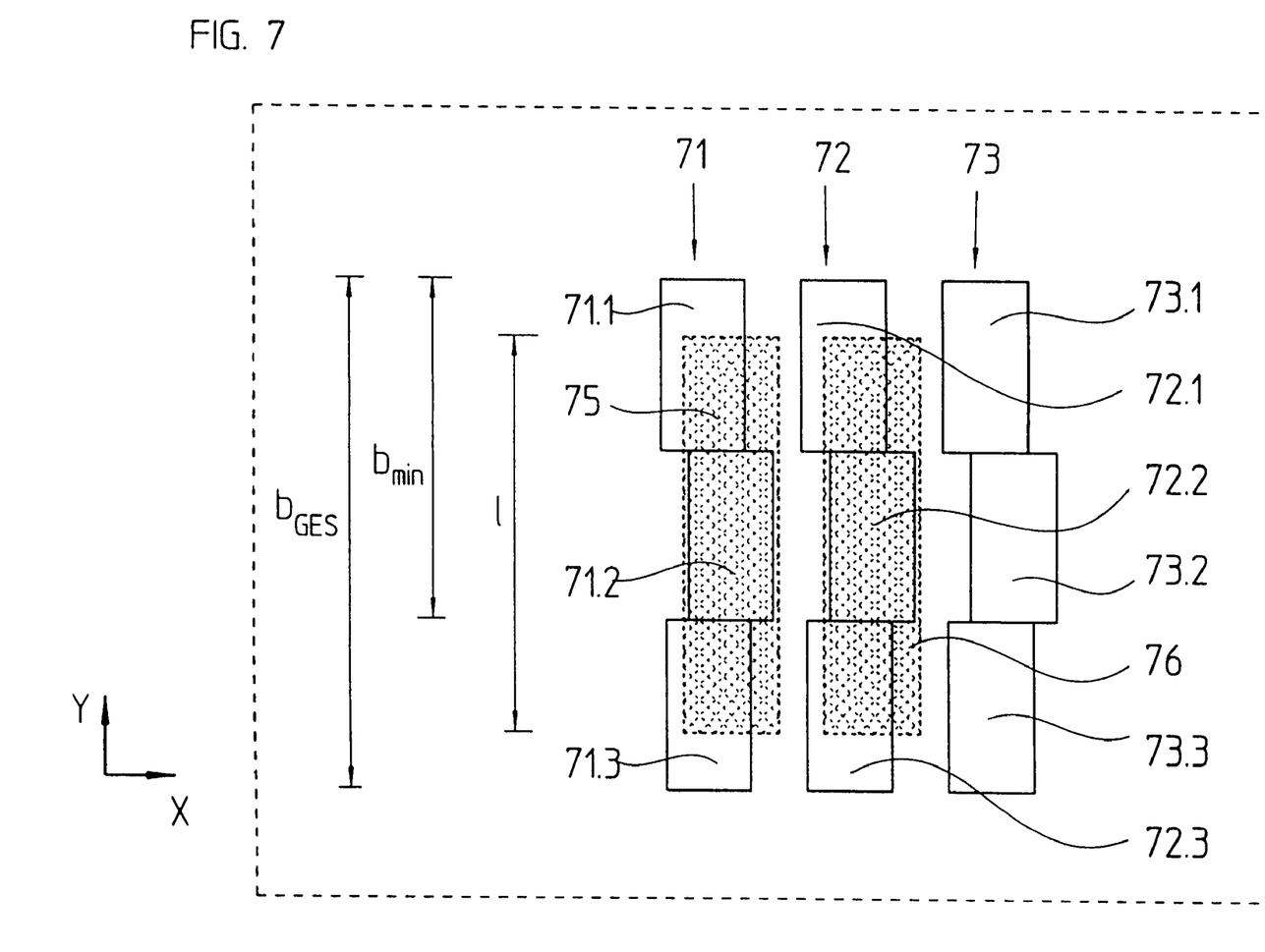
FIG. 7 is a partial plan view of a further embodiment of a scanning graduation to be used with the position measuring systems of FIGS. 1 and 2 in accordance with the present invention in connection with an embodiment of detector elements used for scanning.

A portion of the detector arrangement in the form of two individual detector elements 75, 76, overlying the scanning graduation, is also represented in FIG. 7. As already explained, the periodic fringe pattern resulting in the detector plane is scanned by the detector elements 75, 76, periodically placed there.

It is now possible to recognize clearly by means of the example in FIG. 7 that the total width $b_{GES}$ of the scanning graduation used for filtering harmonic waves, which results from the individual partial tracks, is greater than the length l in its longitudinal direction of a single detector element 75, 76. By this measure, an additional insensitivity regarding the relative positions of the detector elements in relation to the scanning graduation marks is assured, which in this example provide filtering in the y direction, which has as a result a reduced outlay for adjustment during assembly, for example. In this case the length l of a single detector element is preferably selected to be such, that its length l corresponds to a whole number multiple (i=1, 2, 3, ... ) of that resulting width $b_{min}$ of partial tracks which is at least necessary for achieving the desired filtering effect. In the present example of FIG. 7, the length l of the detector element 75, 76 corresponds to the resulting width $b_{min}$ of two partial tracks (i=1). Therefore at least two partial tracks are required for filtering in this example.

Analogously, in the example of FIG. 5 explained above, this would mean that the associated detector element has a length l which corresponds to the width $b_{min}$ of four partial tracks, since in this case at least four partial tracks with corresponding offset spacings are required for filtering the third and fifth harmonic wave, etc.

By such a selection of the detector element length 1 it is assured that a certain tolerance regarding the alignment of the respective graduation marks with respect to the detector elements exists during assembly, as well as during measuring operations, while the desired filtering effect remains assured at the same time.

With this variation of a position measuring system designed in accordance with the present invention it is of course also possible to combine the entire multitude of the above mentioned individual steps.

Furthermore, a number of further alternative embodiments and design options exist on the basis of the above explained principles of the present invention.

Thus, in connection with a scanning beam path in accordance with FIG. 1, for example, it is possible to design the detector arrangement and the scanning graduation as a single detector unit. In this case the scanning graduation would be arranged directly on a flat opto-electronic detector element.

In case of filtering on the scale side, it is furthermore advantageous to match the length of the associated scanning graduation marks and the width of the filtering scale graduation marks with each other analogously with the criteria which were explained by FIG. 7. Accordingly, in order to achieve in this case a corresponding assembly tolerance between the scale and the scanning unit, the length of a graduation mark on the scanning plate would have to be selected, analogously with the criteria in connection with the detector elements, i.e. for one less than the total width of the partial tracks used for filtering, and furthermore at least sufficiently large so that this length corresponds to the width of the partial tracks, or a whole number multiple thereof (i=1, 2, 3, . . . ), which are required for filtering.

It should further be mentioned that linear, as well as rotary position measuring systems can be designed in accordance with the invention. In the latter case a geometry of detector elements can also be employed which differs from the above discussed rectangular shape.

In the same way there exist various embodiments regarding the graduation structures used. Thus, these can be designed a amplitude, as well as phase gratings.

Moreover, there exist further embodiment options of corresponding position measuring systems within the framework of the present invention.

Further exemplary embodiments exist within the scope of the present invention besides the described examples.

I claim:

1. An optical position measuring system, comprising:
  a scale comprising a scale graduation with scale graduation marks, which are periodically arranged at a scale graduation period, $TP_M$, in a measuring direction;
  a scanning unit, which is movable with respect to said scale in at least said measuring direction, said scanning unit comprising:
    a light source that emits light beams;
    a periodic scanning graduation comprising scanning graduation marks arranged periodically at a scanning graduation period along said measuring direction, wherein said scale graduation period, $TP_M$, and said scanning graduation period differ from each other; and
    a detector arrangement, by which in case of a relative movement between said scale and said scanning unit at least one periodic scanning signal is detected, which results from scanning a periodic Vernier fringe pattern having a fringe pattern period in a detector plane of said detector arrangement;
  wherein said scale graduation comprises at least three partial tracks, which adjoin perpendicularly with respect to said measuring direction, and graduation marks associated with each of said at least three partial tracks have a defined and constant offset spacing from their nominal positions, wherein said offset spacings associated with adjoining ones of said at least three partial tracks differ, so that filtering of undesired harmonic waves out of said at least one periodic scanning signal results from said offset spacings.

2. The optical position measuring system in accordance with claim 1, wherein said light source, said periodic scanning graduation and said detector arrangement of said scanning unit are arranged such that said light beams first impinge on said scale graduation, then reach said scanning graduation so that, after said light beams interact with said scanning graduation, said periodic Vernier fringe pattern results in said detector plane.

3. The optical position measuring system in accordance with claim 1, wherein said light source, said periodic scanning graduation and said detector arrangement of said scanning unit are arranged such that said light beams first impinge on said scanning graduation, then reach said scale graduation so that, after said light beams interact with said scale graduation, said periodic Vernier fringe pattern results in said detector plane.

4. The optical position measuring system in accordance with claim 2, wherein said detector arrangement comprises a multitude of individual rectangular-shaped detector elements, which are arranged adjoining each other in said measuring direction, wherein those of said detector elements that are electrically connected with each other provide in-phase periodic scanning signals.

5. The optical position measuring system in accordance with claim 3, wherein said detector arrangement comprises a multitude of individual rectangular-shaped detector elements, which are arranged adjoining each other in said measuring direction, wherein those of said detector elements that are electrically connected with each other provide in-phase periodic scanning signals.

6. The optical position measuring system in accordance with claim 4, wherein always three or four of said multitude of individual rectangular-shaped detector elements are arranged along said measuring direction within a fringe pattern period of said scanned Vernier fringe pattern.

7. The optical position measuring system in accordance with claim 5, wherein always three or four of said multitude of individual rectangular-shaped detector elements are arranged along said measuring direction within a fringe pattern period of said scanned Vernier fringe pattern.

8. The optical position measuring system in accordance with claim 1, wherein said offset spacings are defined as a linear combination of at least two partial offset spacings, $\Delta TV_k$.

9. The optical position measuring system in accordance with claim 8, wherein said at least two partial offset spacings $\Delta TV_k$ are used for filtering the k-th harmonic wave of said at least one periodic scanning signal, wherein said at least partial offset spacings $\Delta TV_k$ is selected in accordance with $$\Delta TV_k = +/- (1/2 * 1/k * TP_M/2),$$

wherein k=2, 3, 5, 7, . . . .

10. The optical position measuring system in accordance with claim 8, wherein each of said at least three partial tracks are multiply arranged with different offset spacings perpendicularly in relation to said measuring direction.

11. The optical position measuring system in accordance with claim 4, wherein a total width of said scale graduation used for filtering harmonic waves resulting from said at least three partial tracks as measured perpendicular to said measuring direction is greater than a length of one of said multitude of individual rectangular-shaped detector elements as measured perpendicular to said measuring direction.

12. The optical position measuring system in accordance with claim 11, wherein said length of one of said multitude of individual rectangular-shaped detector elements corresponds to a resultant width of said at least three partial tracks, or a whole number multiple (i=1, 2, . . . ) thereof, which is at least required for achieving a desired filtering effect.

13. The optical position measuring system in accordance with claim 5, wherein a total width of said scale graduation used for filtering harmonic waves resulting from said at least three partial tracks as measured perpendicular to said measuring direction is greater than a length of one of said multitude of individual rectangular-shaped detector elements as measured perpendicular to said measuring direction.

14. The optical position measuring system in accordance with claim 13, wherein said length of one of said multitude of individual rectangular-shaped detector elements corresponds to a resultant width of said at least three partial tracks, or a whole number multiple (i=1, 2, . . . ) thereof, which is at least required for achieving a desired filtering effect.

15. The optical position measuring system in accordance with claim 1, wherein a length of one of said scanning graduation marks is less than a total width of said at least three partial tracks on said scale used for filtering.

16. The optical position measuring system in accordance with claim 2, wherein said detector arrangement and said scanning graduation are designed in the form of a single detector unit, wherein said scanning graduation is arranged directly on a flat opto-electronic detector element.

17. An optical position measuring system, comprising:
a scale comprising a scale graduation with scale graduation marks, which are periodically arranged at a scale graduation period, $TP_M$, in a measuring direction;
a scanning unit, which is movable with respect to said scale in at least said measuring direction, said scanning unit comprising:
a light source that emits light beams;
a periodic scanning graduation comprising scanning graduation marks arranged periodically at a scanning graduation period along said measuring direction, wherein said scale graduation period, $TP_M$, and said scanning graduation period differ from each other; and
a detector arrangement, by which in case of a relative movement between said scale and said scanning unit at least one periodic scanning signal is detected, which results from scanning a periodic Vernier fringe pattern having a fringe pattern period in a detector plane of said detector arrangement;
wherein said scanning graduation comprises at least three partial tracks, which adjoin perpendicularly with respect to said measuring direction, and graduation marks associated with each of said at least three partial tracks have a defined and constant offset spacing from their nominal positions, wherein said offset spacings associated with adjoining ones of said at least three partial tracks differ, so that filtering of undesired harmonic waves out of said at least one periodic scanning signal results from said offset spacings.

18. The optical position measuring system in accordance with claim 17, wherein said light source, said periodic scanning graduation and said detector arrangement of said scanning unit are arranged such that said light beams first impinge on said scale graduation, then reach said scanning graduation so that, after said light beams interact with said scanning graduation, said periodic Vernier fringe pattern results in said detector plane.

19. The optical position measuring system in accordance with claim 17, wherein said light source, said periodic scanning graduation and said detector arrangement of said scanning unit are arranged such that said light beams first impinge on said scanning graduation, then reach said scale graduation so that, after said light beams interact with said scale graduation, said periodic Vernier fringe pattern results in said detector plane.

20. The optical position measuring system in accordance with claim 18, wherein said detector arrangement comprises a multitude of individual rectangular-shaped detector elements, which are arranged adjoining each other in said measuring direction, wherein those of said detector elements that are electrically connected with each other provide in-phase periodic scanning signals.

21. The optical position measuring system in accordance with claim 19, wherein said detector arrangement comprises a multitude of individual rectangular-shaped detector elements, which are arranged adjoining each other in said measuring direction, wherein those of said detector elements that are electrically connected with each other provide in-phase periodic scanning signals.

22. The optical position measuring system in accordance with claim 20, wherein always three or four of said multitude of individual rectangular-shaped detector elements are arranged along said measuring direction within a fringe pattern period of said scanned Vernier fringe pattern.

23. The optical position measuring system in accordance with claim 21, wherein always three or four of said multitude of individual rectangular-shaped detector elements are arranged along said measuring direction within a fringe pattern period of said scanned Vernier fringe pattern.

24. The optical position measuring system in accordance with claim 17, wherein said offset spacings are defined as a linear combination of at least two partial offset spacings, $\Delta TV_k$.

25. The optical position measuring system in accordance with claim 24, wherein said at least two partial offset spacings $\Delta TV_k$ are used for filtering the k-th harmonic wave of said at least one periodic scanning signal, wherein said at least partial offset spacings $\Delta TV_k$ is selected in accordance with $$\Delta TV_k = +/- (1/2 * 1/k * TP_M/2),$$

wherein k=2, 3, 5, 7, . . . .

26. The optical position measuring system in accordance with claim 24, wherein each of said at least three partial tracks are multiply arranged with different offset spacings perpendicularly in relation to said measuring direction.

27. The optical position measuring system in accordance with claim 20, wherein a total width of said scanning graduation used for filtering harmonic waves resulting from said at least three partial tracks as measured perpendicular to said measuring direction is greater than a length of one of said multitude of individual rectangular-shaped detector elements as measured perpendicular to said measuring direction.

28. The optical position measuring system in accordance with claim 27, wherein said length of one of said multitude of individual rectangular-shaped detector elements corresponds to a resultant width of said at least three partial tracks, or a whole number multiple (i=1, 2, . . . ) thereof, which is at least required for achieving a desired filtering effect.

29. The optical position measuring system in accordance with claim 21, wherein a total width of said scanning graduation used for filtering harmonic waves resulting from said at least three partial tracks as measured perpendicular to said measuring direction is greater than a length of one of said multitude of individual rectangular-shaped detector elements as measured perpendicular to said measuring direction.

30. The optical position measuring system in accordance with claim 29, wherein said length of one of said multitude of individual rectangular-shaped detector elements corresponds to a resultant width of said at least three partial tracks, or a whole number multiple (i=1, 2, . . . ) thereof, which is at least required for achieving a desired filtering effect.

31. The optical position measuring system in accordance with claim 18, wherein said detector arrangement and said scanning graduation are designed in the form of a single detector unit, wherein said scanning graduation is arranged directly on a flat opto-electronic detector element.

* * * * *